Sept. 11, 1923.  A. R. COOPER  1,467,309
DASH CONTROL DEVICE
Filed Nov. 18, 1921
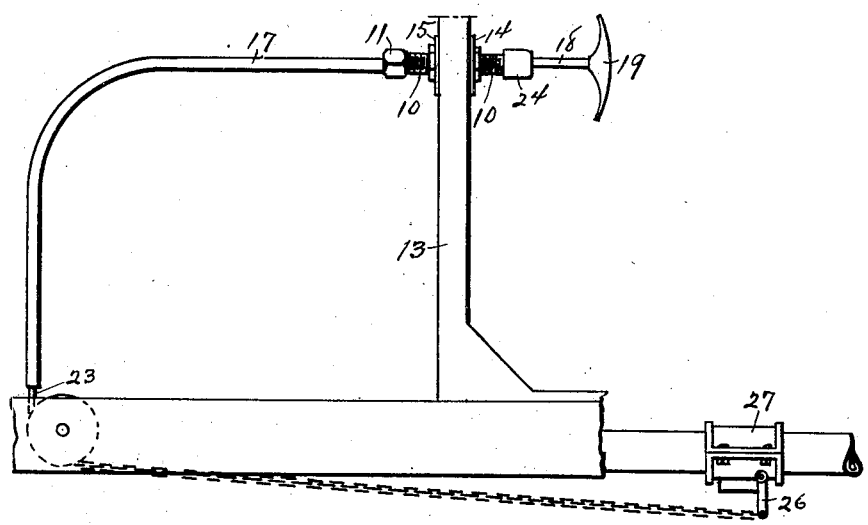
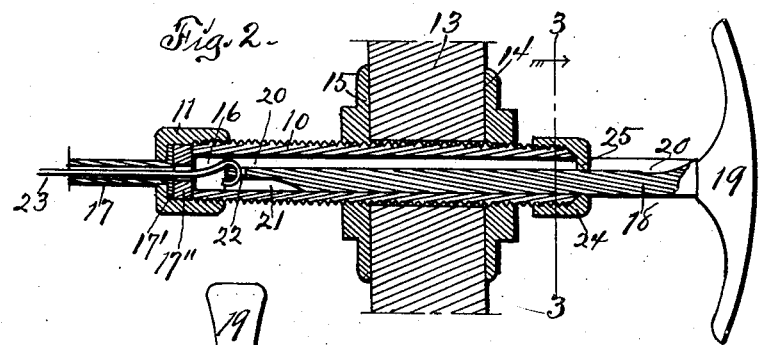
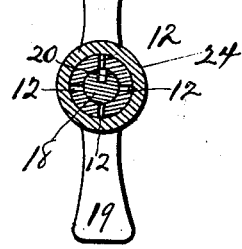
Inventor:
Allyn R. Cooper
By Silas Sweet
Atty Patented Sept. 11, 1923.

1,467,309

UNITED STATES PATENT OFFICE.

ALLYN R. COOPER, OF MARSHALLTOWN, IOWA.

DASH CONTROL DEVICE.

Application filed November 18, 1921. Serial No. 516,028.

*To all whom it may concern:*

Be it known that I, ALLYN R. COOPER, a citizen of the United States of America, and resident of Marshalltown, Marshall County, Iowa, have invented a new and useful Dash Control Device, of which the following is a specification.

The object of the invention is to provide improved means for controlling operating devices such as radiator shutters, exhaust-pipe valves for cut-outs and heaters and the like, said means being adapted to be mounted on the dash or instrument board of a motor vehicle.

A further object of this invention is to provide improved means for locking a control device at any desired point within the range of its movement or adjustment.

A further object of this invention is to provide means whereby a control device may be operated longitudinally to adjust another device and also be operated torsionally to lock it in any adjusted position and hold the other device in any adjusted position.

My invention consists in the construction, arrangement and combination of elements hereinafter set forth, pointed out in my claims and illustrated by the accompanying drawing, in which—

Figure 1 is a side elevation, partly in section, showing my improved device in position for practical use. Figure 2 is a longitudinal section of the device on an enlarged scale. Figure 3 is a cross-section on the indicated line 3—3 of Figure 2.

In the construction of the device as shown the numeral 10 designates a slide bearing, which is provided with a cap nut 11 on one end, is beveled at the opposite end and formed with end-opening slots 12, preferably six in number, equally spaced apart and intersecting the beveled end, and is externally threaded throughout its length except for the bevel. The slide bearing 10 is adapted to be mounted through a hole formed in a dash or instrument board 13 of a motor vehicle, or other suitable supporting device, and is clamped thereto by flanged nuts 14, 15 screwed on its external thread and abutting opposite faces of the dash 13, whereby the bearing is normally held against rotation. The bearing 10 is formed with an internal bore 16 and a tube 17 is passed loosely through a hole in the cap nut 11 and is formed with a flange 17' confined within said nut and is engaged by a washer 17" also within the nut. A stem 18 is fitted to and loosely mounted in the opposite end portion of the bore 16 and a handle or crosshead 19 is fixed to the outer end of said stem. The handle 19 is adapted for manipulation to reciprocate or rotate the stem 18 in the bore 16. A key-way or slot 20 is formed in and longitudinally of the stem 18, a groove 21, of less length, is formed in the stem diametrically opposite the inner end portion of said key-way, and a hole 22 is formed in said stem and communicates between the inner ends of the key-way and groove. A draft-wire 23 is extended through the tube 17 within the bore 16 and one end thereof is looped through the hole 22 and lies within the inner ends of the key-way and groove. A nut 24 is loosely mounted on the stem 18 and is formed with a spline 25 adapted for sliding engagement in the key-way 20. The nut 24 is formed with a chamber concentric with its bore and the bottom of the chamber is beveled to match the bevel of the adjacent end of the bearing 10. The outer end of the wall of the chamber in the nut 24 is threaded to match the external thread on the bearing 10. The outer end of the draft-wire 23 is adapted to be secured or connected to a device to be operated such as a valve 26 of a muffler cut-out 27 as shown in Figure 1.

In practical use, the parts are normally in the position shown. When it is desired to turn the valve 26, or other device, to open position, the handle 19 is turned manually contra clockwise substantially one-fourth of a revolution, to release the nut 24 from the beveled end of the bearing 10, and said handle and stem, together with the wire 23, is drawn outwardly and longitudinally relative to the bearing to the desired extent. Then the handle is turned clockwise, to advance the nut 24 on the bearing and cause the beveled face thereon to engage the beveled end of the bearing and compress the spaced portions of the bearing, at its slotted end, upon the stem, thereby gripping the stem rigidly to the bearing and holding said stem and the wire in their extended position. The device may be released by contra-clockwise movement of the stem and handle, whereby the gripping portions of the bearing relax from the stem, and a longitudinal movement of the handle, stem and wire. Some operated devices, such as muffler cut-outs 27, are provided with springs for closing purposes, which will automatically reposition the wire, handle and stem when the stem is released.

The control device as above described may be employed with any desired device to be operated thereby and the connection between the wire 23 and operated device may be as selected by the user.

I do not wish to be understood as limiting myself to the exact construction defined, as the same may be modified within the terms of the appended claims.

I claim as my invention—

1. A dash control-device, comprising a bearing adapted to be mounted in a dash and formed with integral gripping means, a stem loosely mounted in said bearing, a draft device on said stem and extending from the bearing, and means on and operated by the stem for actuating the gripping means and thereby connecting the stem and bearing against movement relative to each other.

2. A dash control-device, comprising a bearing adapted to be mounted in a dash and formed with slots in one end, a stem loosely mounted in the bearing, a draft device attached to the stem and extending from the bearing, and a nut slidingly mounted on and adapted to be rotated by said stem, which nut is threaded to the bearing and is adapted to compress or contract the slotted end thereof at times.

3. A dash control-device, comprising a bearing formed with end-opening slots at one end and beveled at its slotted extremity, a stem loosely mounted in said bearing, a draft-device fixed to said stem and extending from the bearing and adapted to be secured to a device to be operated, a nut on said stem splined thereto and threaded to the slotted end of the bearing, said nut being formed with an inclined inner wall adapted to contact with the beveled end of the bearing and contract it upon said stem.

4. A dash control-device, comprising a tubular support threaded externally, clamping nuts thereon, one end portion of said support being slotted and beveled at its extremity, a stem mounted loosely in said support and formed with a key-way, a groove opposite said key-way and a hole connecting the key-way and groove, a draft-wire extending within the support and looped through said key-way, hole and groove, a guiding tube for said wire secured to said support, a handle on the stem, and a nut on said stem formed with a spline in said key-way, a threaded chamber adapted to be screwed on said support and having a beveled bottom wall adapted to engage said beveled extremity.

Signed at Marshalltown, in the county of Marshall and State of Iowa, this 7th day of September, 1921.

ALLYN R. COOPER.